(12) United States Patent
Watley et al.

(10) Patent No.: US 6,778,782 B1
(45) Date of Patent: Aug. 17, 2004

(54) DISPERSION COMPENSATION

(75) Inventors: Daniel A Watley, Cambridge (GB); Julian A Fells, Epping (GB); Anagnostis Hadjifotiou, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 621 days.

(21) Appl. No.: 09/671,862

(22) Filed: Sep. 27, 2000

(51) Int. Cl.[7] .............................................. H04B 10/12
(52) U.S. Cl. ...................... 398/147; 398/152; 385/11; 385/24
(58) Field of Search ................................ 398/147, 152, 398/158, 161, 148, 162, 180, 208, 65; 385/11, 24

(56) References Cited

U.S. PATENT DOCUMENTS

| | | | | |
|---|---|---|---|---|
| 5,930,414 | A | * | 7/1999 | Fishman et al. ............... 385/11 |
| 6,130,766 | A | * | 10/2000 | Cao ............................ 398/147 |
| 6,266,457 | B1 | * | 7/2001 | Jacob .......................... 385/11 |
| 6,271,952 | B1 | * | 8/2001 | Epworth ..................... 398/147 |
| 6,317,240 | B1 | * | 11/2001 | Penninckx et al. ......... 398/147 |
| 6,330,375 | B1 | * | 12/2001 | Fishman et al. ............. 385/11 |
| 6,370,300 | B1 | * | 4/2002 | Eggleton et al. ............... 385/37 |
| 6,385,356 | B1 | * | 5/2002 | Jopson et al. .................. 385/11 |
| 6,459,830 | B1 | * | 10/2002 | Pua et al. ...................... 385/24 |
| 6,498,886 | B1 | * | 12/2002 | Sobiski et al. ............. 385/122 |
| 6,559,991 | B1 | * | 5/2003 | Farley et al. ............... 359/156 |

OTHER PUBLICATIONS

Feng, "Dynamic dispersion Compensation in a 10–Gb/s Optical System Using a Novel Voltage Tuned Nonlinearly Chirped Fiver Bragg Grating" IEEE Photonics Technology Letters, vol. 11, No. 3, Mar. 1999, pp 373–375.

Kudou, "Theoretical Basis of Polarization Mode Dispersion Equalization up to the Second Order", Journal of Lightwave Technology, vol. 18, No. 4 Apr. 2000, pp 614–617.

* cited by examiner

*Primary Examiner*—Hung N. Ngo
(74) *Attorney, Agent, or Firm*—Barnes & Thornburg

(57) ABSTRACT

A polarization mode dispersion (PMD) compensation arrangement receives an optical input data signal which has been subjected to PMD. The arrangement comprises an adaptive chromatic dispersion compensator (24) and a first-order PMD compensator (20,22) in series, wherein the adaptive chromatic dispersion compensator is controlled to provide compensation for both chromatic dispersion and second order PMD. The compensation arrangement is used in a node of an optical network.

11 Claims, 4 Drawing Sheets

DISPERSION COMPENSATION

FIELD OF THE INVENTION

This invention relates to methods and apparatus for providing dispersion compensation in high-speed optical transmission networks and systems, and in particular to chromatic dispersion and polarisation mode dispersion compensation, including high-order polarisation mode dispersion.

BACKGROUND OF THE INVENTION

Fibre-optic transmission systems are now being developed for tens of gigabits-per-second (Gbit/s) communication channels, whilst large volumes of 10 Gbit/s systems are being fully deployed into existing networks. Various potential limits are approached as the performance of such transmission system is pushed further. The phenomenon of polarisation mode dispersion, PMD, is a problem recently attracting a great deal of attention from the telecommunications industry. PMD is a type of distortion that varies from fibre to fibre and is typically of greater magnitude in older fibres. PMD is also a random phenomenon, varying with both time and optical frequency. Whilst service providers are reluctant to invest in new fibre routes, PMD may restrict the deployment of new systems over the older fibre routes of their network. In a small number of fibres, PMD will give rise to distortions so large that a 10 Gbit/s optical transmission system cannot be reliably deployed over the route. The impact of PMD scales linearly with system bit-rate, hence PMD will become a greater problem as the bit-rate of systems are increased. It is for these reasons that PMD solutions have to be found.

PMD is a fundamental characteristic of both optical fibres and optical components. It arises from the consideration that single mode fibre can actually support two weakly guided modes that are orthogonally polarised. In other words, given an ideal fibre, a pulse can be launched into either of these two polarisation modes and propagate through the fibre in that polarisation mode alone. A fiber exhibits slightly different refractive indices along different axes, a physical characteristic known as birefringence, Birefringence arises from a variety of intrinsic and extrinsic features of the fibre manufacture. These features include geometric stress caused by a noncircular core, and stress birefringence caused by unsymmetrical stress of the core. Other sources of birefringence include external manipulation of the fibre. External forces will include squeezing the fibre, bending the fibre and twisting of the fibre.

In a birefringent fibre, the propagation speed will vary with the launch polarisation gate into the polarisation modes of the fibre. Consequently, when proportions of the pulse are launched into both polarisation axes they travel at different speeds and hence arrive at different times. The magnitude of the difference in arrival times between the fastest and slowest paths through the fibre is known as the differential group delay (DGD).

The receiver of a direct detection optical transmission system does not distinguish between the different polarisation modes, but simply detects the combination of the different polarisation modes. The difference in arrival times of the pulse through the two polarisation modes will degrade the quality of the received data.

In a long length of fibre the birefringence is expected to be weak but vary randomly along its entire length. This leads to random mode coupling along the fibre, a process by which the pulse will continuously couple power between the two polarisation modes of the fibre. The phenomenon of PMD relates to the random variation of the DGD of the fibre. The DGD is expected to vary randomly over time due to random variations of the fibre birefringence as a result of environmental effects, such as temperature. A consequence of this random variation means that the instantaneous DGD of a fibre cannot be predicted. Instead the DGD of a fibre must be described statistically. The fibre DGD also varies over frequency/wavelength.

The DGD is the first-order consideration of PMD. It makes the assumption that the PMD characteristics of a fibre are constant over the bandwidth of the transmitted data signal. Higher-orders of PMD are considered when the PMD characteristics can no longer be considered constant over the bandwidth of a signal. Higher-order PMD relates to the variation of the PMD characteristics of a fibre with frequency.

In order to compensate for first order PMD, it has been proposed to use a delay line which provides differential delay for different polarisation states, in order to reverse the system fiber DGD. A particular class of fibres, known as high birefringence (Hi-Bi) fibres, has been engineered deliberately to have very high, uniform birefringence for this purpose. The fibres have two clearly definable axes with different refractive indices. The propagation speed of a pulse will differ greatly between each axis.

Three categories of techniques are used for PMD compensations. They are all-optical, all electrical, and hybrid.

For all-optical PMD compensation, the restoration of PMD distortion is done optically without any optical-electrical conversion. The signal remains in the optical domain. Normally, all-optical PMD compensators consist of a polarization controller and either a variable or a fixed birefringent delay element, such as a piece of high birefringence optical fiber. The basic concept is to find the principal states of polarization (PSP) of the fiber into the axes of the birefringent delay element to reverse the DGD of the system fiber. A control feedback signal is used to give an indication of the level of distortion imparted on the transmitted data at the receiver, after the PMD compensator. This can then be used to adjust the alignment of the polarization controller, and the variable delay element (if being used) to provide maximum compensation of the PMD distortions to the data. Filtered components of the received electrical spectrum can be used to give an indication of the quality of the received data.

In the all-electrical method, the distorted optical signal is converted to an electrical signal at the receiver. A delay line filter with specific weights is used to partially compensate for the distortion due to PMD.

Hybrid PMD compensation is a technique that uses both optical and electrical methods to restore the distortion due to PMD. For example a polarization controller (PC) and a polarization beam splitter (PBS) can be used to transform the states of polarization, and split the polarization components. At each output of the PBS, a high-speed photo-detector converts tile optical signal to electrical signal. An electrical delay line is used to adjust the phase delay between the two electrical signals.

Although there are various techniques for compensating for first order PMD, higher data rates now result in the higher-order effects of PMD becoming significant. A detailed analysis of the properties of higher order PMD will not be given, but a brief analysis follows.

The PMD can be represented as a three-dimensional dispersion vector, $\vec{\Omega}$. The magnitude of the vector represents the instantaneous DGD, $\Delta\tau$, of the fibre.

$$\Delta\tau = |\vec{\Omega}|$$

The dispersion vector will often be defined directly in terms of the DGD and the position of the fat PSP of the fibre, $\hat{q}$. The dispersion vector is defined as follows:

$$\vec{\Omega} = \Delta\tau \hat{q}$$

In the first order, PMD impact is simply dependent upon the instantaneous DGD and on the angle of orientation of the PSPs, or more specifically the relative angle between the PSP orientation and the launch angle of light into the fiber.

The form of the second-order PMD characteristics can be considered by taking the first derivative of the PMD dispersion vector with respect to optical frequency.

$$\vec{\Omega}_\omega = \frac{d\vec{\Omega}}{d\omega} = \frac{d\Delta\tau}{d\omega}\hat{q} + \Delta\tau\frac{d\hat{q}}{d\omega}$$

Second-order PMD can thus be divided into two components; the linear dependence of DGD with frequency (the first term), and the linear rotation of the positions of the PSP's of a fibre with frequency (the second term).

SUMMARY OF THE INVENTION

According to the invention, there is provided a polarization mode dispersion (PMD) compensation arrangement for receiving an optical input data signal which has been subjected to PMD, the arrangement comprising an adaptive chromatic dispersion compensator and a first-order PMD compensator, wherein the adaptive chromatic dispersion compensator is controlled to provide compensation for both chromatic dispersion and second order PMD).

The invention is based on the realisation that second order PMD may be considered equivalent to chromatic dispersion. In other words, second-order PMD results in deformations of a transmitted pulse that are identical in nature to those attributed to chromatic dispersion. Therefore, second-order PMD can be considered as an additional polarization dependent chromatic dispersion term, which results in a linear variation of the propagation speed of the spectral components of a transmitted pulse.

The arrangement of the invention thus uses a chromatic dispersion compensator to provide second-order PMD compensation, based on the realisation outlined above. A (conventional) first order PMD compensator provides first order PMD compensation, so the total system provides chromatic dispersion compensation as well as first and second order PMD compensation.

Preferably, the adaptive chromatic dispersion compensator and the first-order PMD compensator are in series.

Preferably, a feedback loop from the output of the arrangement is used to derive control signals for controlling the adaptive chromatic dispersion compensator and the first-order PMD compensator, This feedback loop may provide electrical spectrum analysis of the output.

As one example, the first-order PMD compensator may comprise a polarization controller and a fixed birefringent delay element. The adaptive chromatic dispersion compensator may comprise first and second chirped Bragg reflection gratings, wherein at least the first grating is coupled with a strain applicator for applying axial strain to the grating for turning the grating. The strain applicator may comprises a piezoelectric transducer on which the chirped grating is mounted.

Preferably, the piezoelectric transducer can be tuned so that the grating provides a selected level of dispersion compensation within less than 1 ms.

The strain applicator of the first grating may enable dispersion compensation within a range of less than 60 ps/nm, and wherein the second grating is also coupled with a strain applicator which enables dispersion compensation within a range greater than 60 ps/mm. The second order PMD results in dispersion deviations of less than 60 ps/nm, and this is required to respond rapidly, whereas compensation over the larger range is for normal chromatic dispersion compensation, which is able to respond more slowly.

The invention also provides a method of providing polarization mode dispersion (PMD) compensation comprising:
   using an adaptive chromatic dispersion compensator to compensate for chromatic dispersion and second-order PMD; and
   using a first-order PMD compensator to compensate for first order PMD.

The compensation arrangement is preferably implemented in a node for an optical communications system.

BRIEF DESCRIPTION OF THE DRAWINGS

An example of the invention will now be described in detail with reference to the accompanying drawings, in which.

DETAILED DESCRIPTION

Essentially, the invention provides polarization mode dispersion (PMD) compensation using an adaptive chromatic dispersion compensator and a first-order PMD compensator in series, wherein the adaptive chromatic dispersion compensator is controlled to provide compensation for both chromatic dispersion and second order PMD. Any conventional first order PMD compensator may be used in the invention, and examples of these will first be described before describing the system of the invention in more detail.

Figure 1:
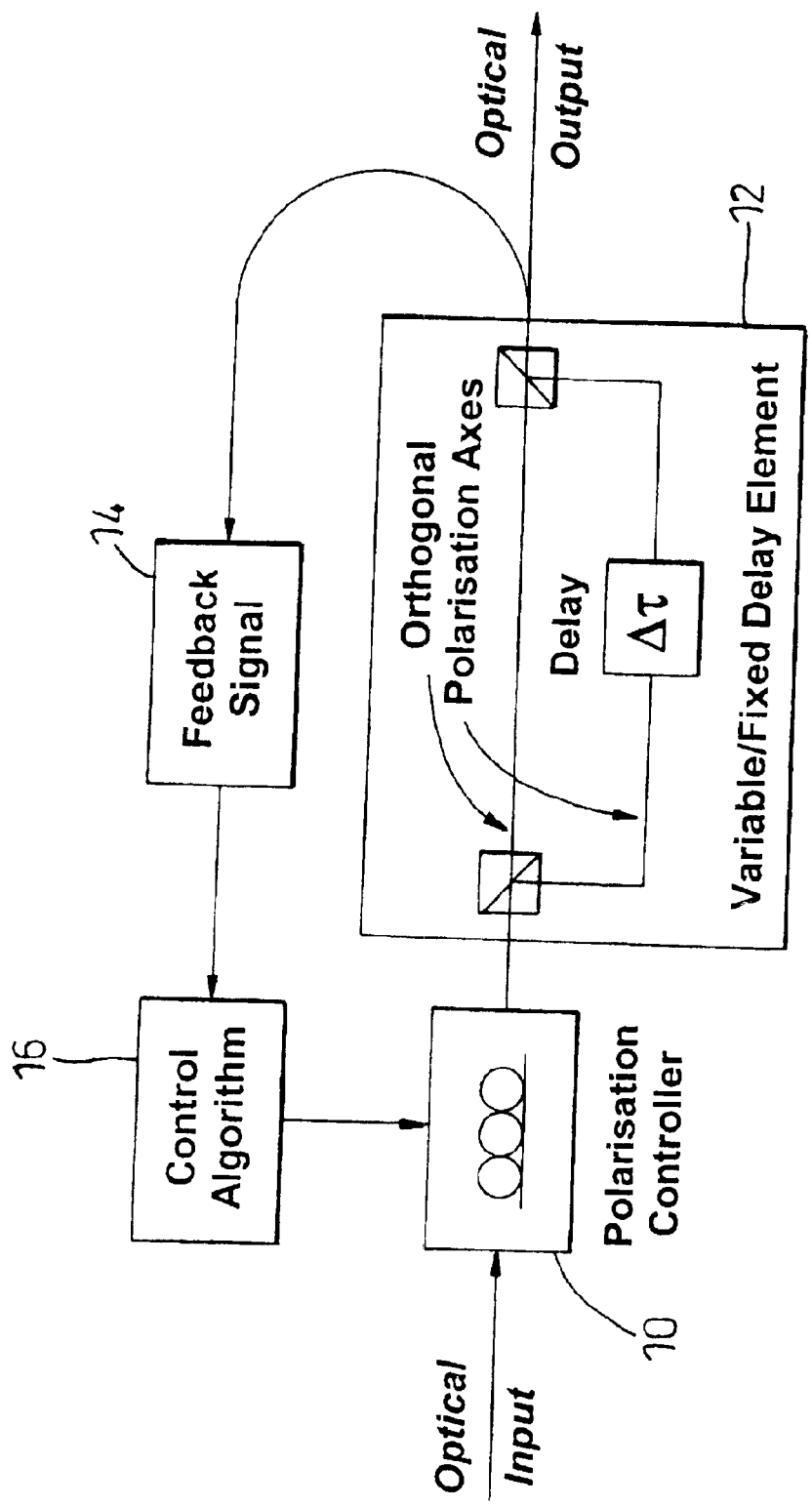
FIG. 1 is a generic diagram illustrating the configuration of known first order PMD compensating arrangements.

As described above, a basic description of first order PMD is of two orthogonal polarisation modes arriving at different times at the receiver due to PMD. The most basic concept for an optical PMD compensator would be to delay the faster of the two polarisation modes by an amount that realigns them both. The majority of PMD compensation schemes proposed have used this simple idea, following similar design concepts. As shown in FIG. 1, in its simplest form, an optical PMD compensator can be built from the combination of a polarisation controller 10, an optical birefringent delay element 12 and some form of feedback signal 14 which is used by a control algorithm 16 to control the polarisation controller 10.

The proposed schemes differ in the number of polarisation controllers and delay elements used, or whether fixed or variable delay elements are used. Several other novel approaches have been suggested. These have included the use of a phase modulator and a length of dispersion compensating fibre, producing pulse compression to combat the pulse broadening induced by PMD. The use of two receivers has also been suggested.

The combination of a polarisation controller 10 and a variable birefringent delay element 12 is the most intuitive of all the optical PMD compensator architectures. A variable birefringent delay element is used to provide a DGD matching that of the transmission system. The polarisation controller 10 is used at the input to the variable optical delay element 12 to align the fast transmission axes of the system with the slow axes of the delay element, and slow to fast respectively. This allows the delay element to exactly realign the split and delayed paths of the transmission system. This architecture considers only first-order PMD, the simple split and delay between orthogonal polarisation axes in the transmission system.

The proposal of using a single polarisation controller and a single fixed birefringent delay element has the advantage of significant simplicity over the variable delay architecture, in terms of technology and control. The details of how the architecture operates are less intuitive, but can be explained by considering a more simplified mode of operation. If the instantaneous DGD of the system is approximately equal to the DGD of the fixed delay element, the fast and slow axes of the transmission system are aligned to the slow and fast axes of the birefringent delay element respectively using a polarisation controller. This allows the delay element to reverse the system DGD. If, alternatively, the system DGD approaches zero, then launching equal power into the two axes of the birefringent delay element would incur a considerable penalty onto a system with negligible transmission impairments. However, a polarisation transformation that launches all the light into either of the two axes of the delay element will not incur any additional system penalty. The use of a suitable control algorithm will vary the launch state into the fixed delay element to provide the best system performance across a wide compensation range.

It is recognised that a first-order PMD compensator is unlikely to be sufficient for 40 GBit/s systems transmitting over very high PMD routes. The need for second-order PMD compensation is therefore apparent. One proposal for compensating for higher order PMD is based in the recognition that the perforce of the fixed and variable delay architectures are limited through their use of a single delay element, and hence their inability to have any dramatic impact on higher-order PMD effects. It has been proposed to use a concatenation of several polarisation controllers and delay elements, providing a compensator that is capable of compensating higher-orders of PMD.

Figure 2:
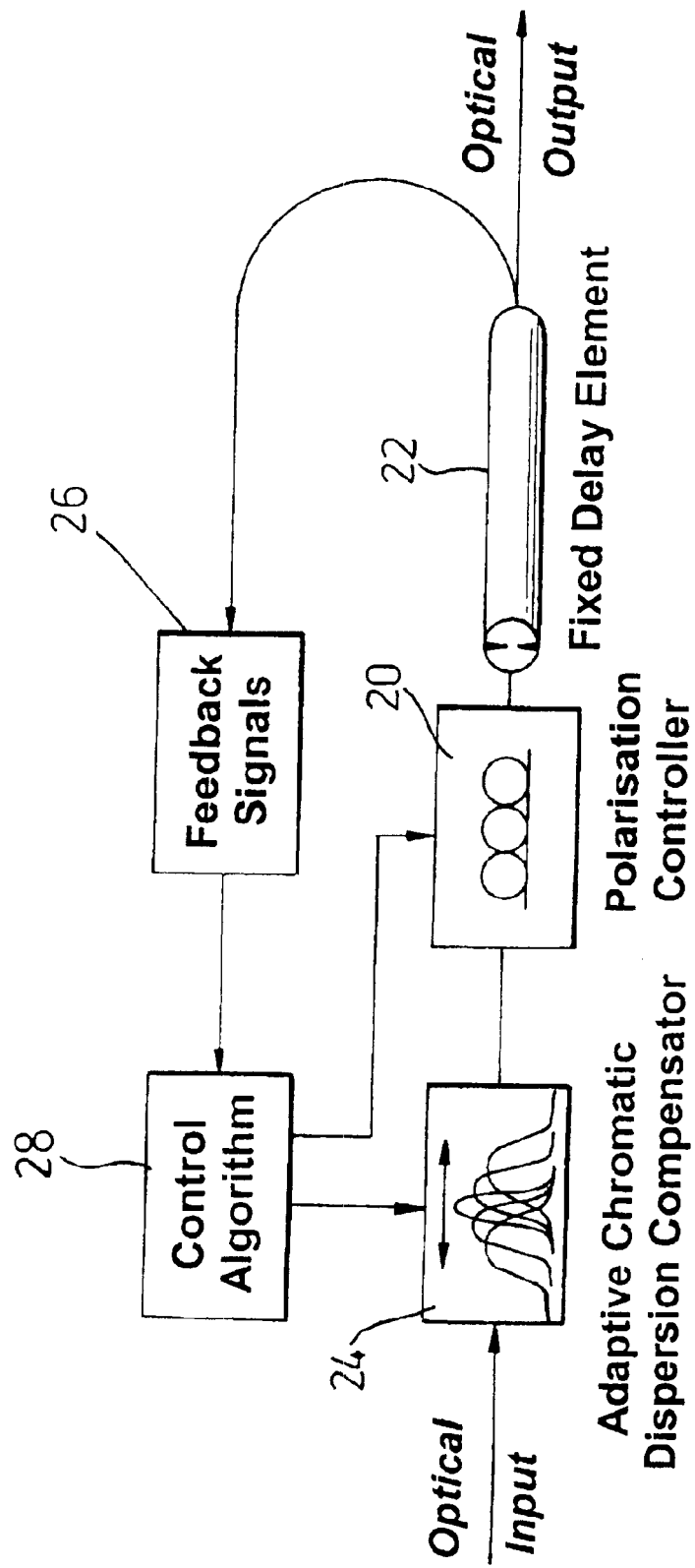
FIG. 2 shows a PMD compensator according to the invention.

The invention provides a simpler solution to the problem of second-order PMD compensation. FIG. 2 shows one possible compensator arrangement of the invention. The architecture incorporates a polarisation controller 20, fixed delay 22 and an adaptive chromatic dispersion compensator 24. A feedback path 26 from the output provides the feedback signals required for control of the polarisation controller 20 and the PMD compensator. Although a single feedback loop is shown, the two compensators may have individual control feedback paths, with a tap between the devices. The control signals are provided by a control algorithm 28. This arrangement compensates for PMD and chromatic dispersion, and essentially comprises a combination of a fixed delay PMD compensator and an adaptive chromatic dispersion compensator.

The fixed delay PMD compensator architecture removes the majority of the PMD penalty. The residual dispersion of the system arises from the combination of chromatic dispersion and uncompensated higher-order PMD components. The adaptive chromatic dispersion compensator 24 is used to remove this residual dispersion.

Figure 3:
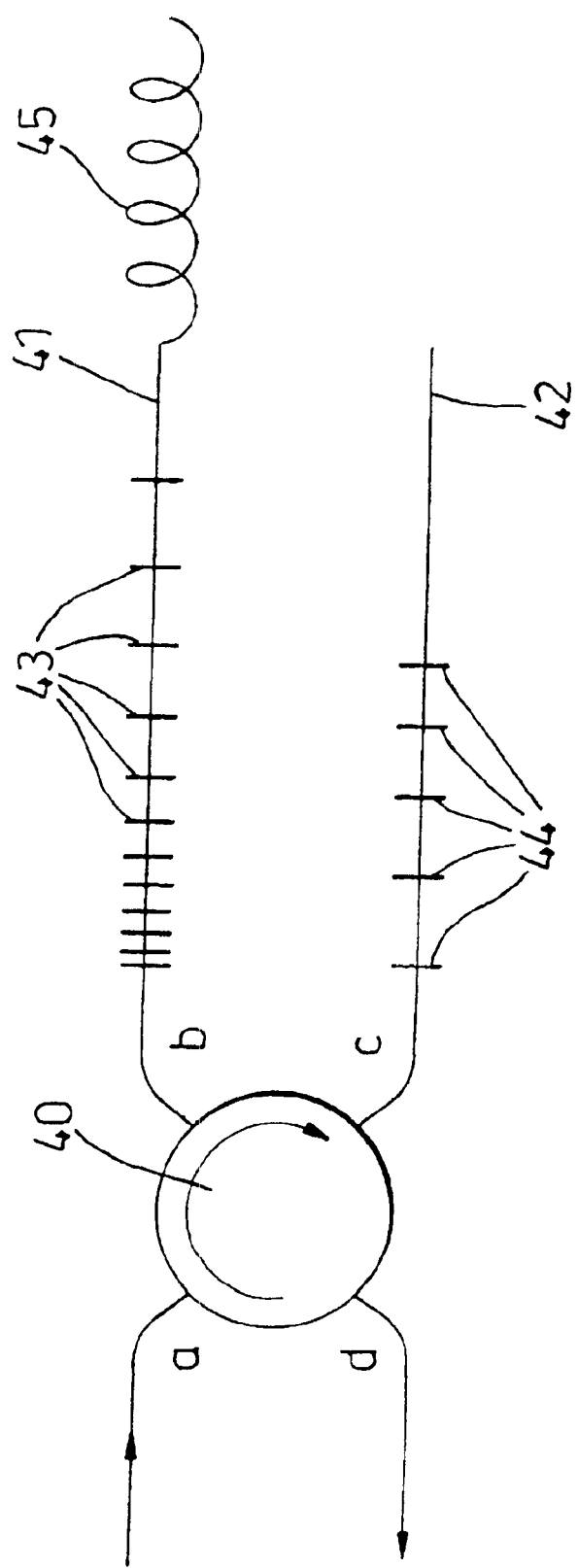
FIG. 3 shows in greater detail the chromatic dispersion compensator used in the compensator of FIG. 2.

The adjustable chromatic dispersion compensator is shown in more detail in FIG. 3, and has three principal components: a four-port circulator 40, two optical fibres 41 and 42 provided with respective chirped Bragg reflective gratings 43 and 44, and some form of adjustable tensile (and/or compressive) strain applicator 45 for axially staining waveguide 41 uniformly over the length of its grating 43 (this strain applicator being symbolically represented in this Figure by a helical spring. Light that enters the circulator 40 by way of its port 'a' emerges by way of its port 'b', to which fibre 41 with its grating 43 is optically coupled. The light that is reflected by this grating 43 re-enters the circulator by way of port 'b', and re-emerges by way of its port 'c', to which fibre 42 with its grating 44 is optically coupled. The light that is reflected by this grating 44 re-enters the circulator by way of port 'c', and re-emerges by way of its port 'd'. If desired, the rotation sense of the circulator 40 can without problem be reversed so that the reflection in the fixed grating occurs before that in the adjustable one instead of after it.

The chirp of grating 43 has non-zero (positive or negative) terms of both linear and quadratic chirp (but no significant magnitude higher order terms). The chirp of grating 44 also has a non-zero term of quadratic chirp (and similarly, no significant magnitude higher order terms). The modulus of this quadratic chirp is substantially matched with that of grating 43, but the two are of opposite signs so that the contribution of quadratic dispersion imparted to light reflected in the grating 43 of fibre 41 is substantially cancelled out by that imparted to the light when it is reflected in the grating 44 of fibre 42.

By way of a specific example, the grating 43 may be an approximately 100 mm long grating, varying in dispersion from $D_0$=200 ps/nm to $D_1$=1000 ps/nm and having a positive dispersion slope of Q=500 ps/nm$^2$. The pitch of the grating elements increases, with increasing distance from the circulator, to a value providing a Bragg reflection wavelength, $\lambda$, just exceeding the design wavelength band for which dispersion compensation is required, typically a waveband in the vicinity of 1550 nm. The grating 44 has a quadratic component of chirp of substantially matching modulus, but opposite sign (i.e. $Q_0 \approx$ −500 ps/nm$^2$). Its let can be shorter than that of grating 43 because it needs only be long enough to compass the waveband of operation. Its linear component of chirp may be of either sign. It may be preferred to make it of opposite sign to that of the grating 43, and of an intermediate modulus, so that operational adjustment of the dispersion afforded by grating 43 enables the aggregate dispersion afforded by the two gratings to range from a negative value to a positive one.

This compensation arrangement is described in more detail in the assignee's co-pending U.S. patent application Ser. No. 09/385,939 (Nortel Reference 105624ID), which is incorporated herein by reference. A similar arrangement is also described in the paper "Twin Fibre Grating Adjustable Dispersion Compensator for 40 Gbits/s", Proc ECOC 2000, postdeadline paper 2.4, although in which both Bragg gratings are adjustable. This paper is also incorporated herein by way of reference material.

The chromatic dispersion compensator of the invention needs to respond rapidly in order to react to the rapid changes in second-order PMD It has been realised that the fastest changes in the PMD of a fibre route may not occur due to environmental changes. Very fast, non-deterministic changes can occur due to mechanical vibrations or simple movement of a patchcord by engineers. Imagine a two span system with equal amount of PMD, $\overline{\Delta\tau}$, in each span. The patchcord, exposed at an amplifier site where the two spans come together, will act as a mode coupling point between the two lumps of PMD. If the patchcord is moved slightly, the polarisation transformation between the two spans will change in a split second. The fibre route could go from almost no PMD to a very large amount of PMD due to a small movement of the patchcord. These fast transients of PMD have been analysed, by measuring the PMD distortion of a suitable test signal. Significant fluctuations of the test signal were recorded and found to be on the scale of a few milliseconds. This type of random, non-deterministic exploration poses a significant problem in the task of defining how we expect PMD to behave over time. It also clearly sets the target response speed of PMD compensation schemes. For example, a response time of less than 1 ms is desired.

A dispersion compensator providing the required speed of response is described in the paper "Dynamic Dispersion Compensation in a 10 Gb/s Optical System Using a Novel Voltage Tuned Nonlinearly Chirped Fiber Bragg Grating" in IEEE Photonics technology Letters Vol. 11, No. 3, March 1999, pages 373 to 375. This is incorporated herein by way of reference material. This article shows that the use of a strain arrangement in the form of a piezoelectric transducer on which the chirped grating is mounted is able to provide the required response speeds.

This response speed is, however, only required over the range of chromatic dispersion values which can result from second order PMD. This range may be 60 ps/nm. It is possible to provide the rapidly adjustable grating with only 60 ps range of adjustment, and to provide the remainder of the required adjustment by the second adjustable Bragg grating using a less rapid control system. For example, this may comprise a jig having ferrules attached to each end of the fiber, the ferrules being moved by an expanding arrangement, for example a piezoelectric stack, or else a solenoid operated drive mechanism.

The architecture of the invention is capable of removing impairments due to chromatic dispersion and two orders of PMD. The architecture is capable of restoring data completely distorted through either PMD or chromatic dispersion, using just two control loops i.e. it is not limited to small levels of distortion. It provides an excellent balance between performance and complexity.

Only one specific compensator design has been described. It will be apparent to those skilled in the an that many different types of first order PMD compensator may be used other than the fixed delay element design of FIG. 2, and that many different types of adaptive chromatic dispersion compensator may also be used. Although an arrangement with two Bragg gratings has been described, the chromatic dispersion compensation can be achieved with a single Bragg grating. Furthermore, instead of the circulator and chirped tuneable Bragg grating arrangement, other arrangements based on multiple reflections may be used. For example, a tunable dispersion compensator based on a multistage optical all-pass filter with a tuned cavity can be employed. Such a device is described in detail in the paper "A Tunable Dispersion Compensating MEMs All-Pass Filter", IEEE Photonics Technology Letters, Vol. 12, No. 6, June 2000 pp 651–653. Light in the cavity undergoes multiple reflections, and dispersion is adjusted by changing the reflectivity of one end facet of the cavity.

As one further alterative, U.S. Pat. No. 5,930,045 disclosed a virtually imaged phased array, in which an angled glass plate enables multiple reflections and hence a number of images of the original signal. These are all focused onto a single mirror and reflected back out of the suture to the input port. The dispersion is adjusted by changing the angle of the glass plate.

As mentioned above, the feedback control may be based on analysis of the electrical spectrum of the output using high speed electronics. Components of the electrical spectrum are filtered and used to provide an indication of the global performance of the system. They are not PMD or chromatic dispersion specific, but this is in fact an advantage. In particular, the electrical spectrum is used to provide an evaluation of the eye opening size of the optical signal. For example, a series "10101010 . . . " should have an almost pure component at half the bit frequency. The magnitude of this component decreases as the eye opening is reduced by any distortion in the system. The analysis of electrical spectrum components is described in more detail in the paper Takahashi, T., Imai, T., & Aiki, M., "Automatic compensation technique for timewise fluctuating polarisation mode dispersion in inOline amplifier systems", Electronics Letters, Vol 30., No. 4, Feb. 17, 1994, pp.348-349. This paper is incorporated herein by way of reference material.

Figure 4:
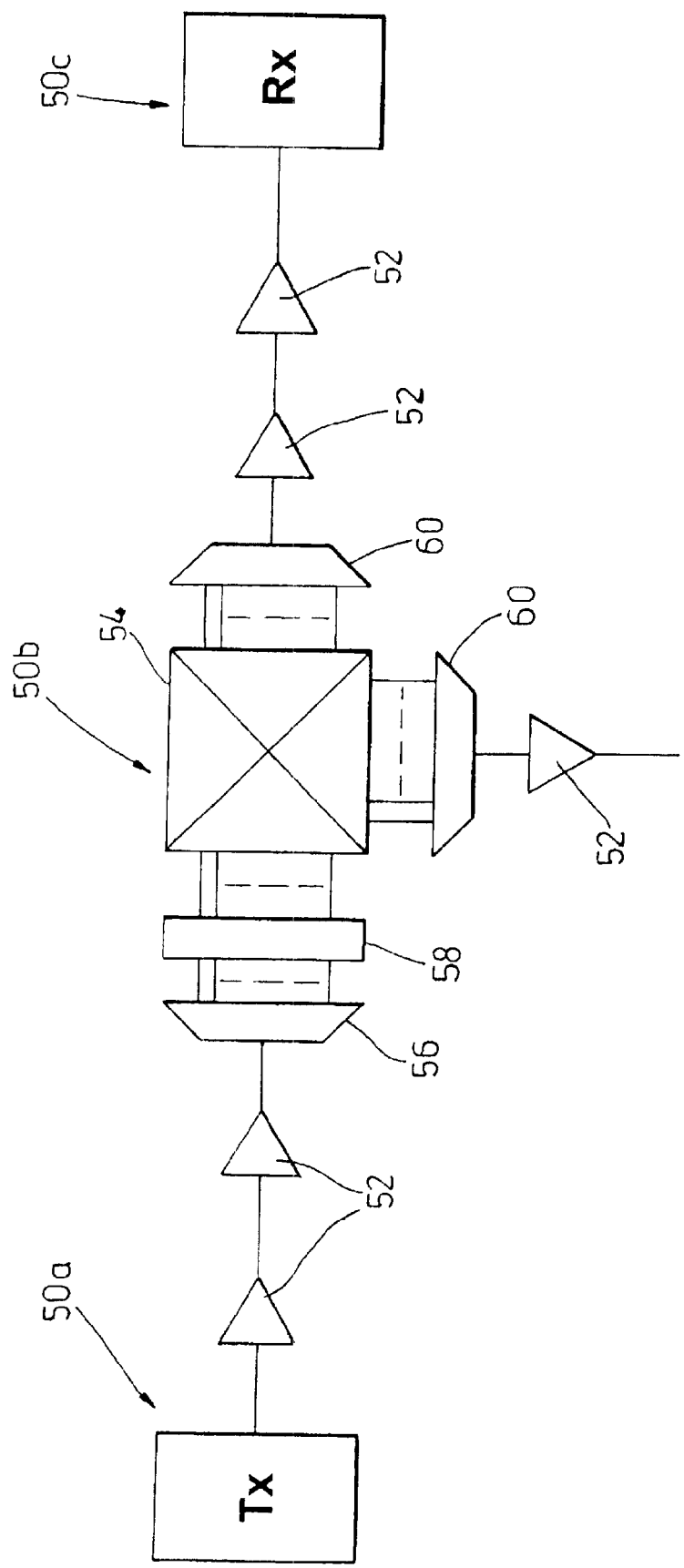
FIG. 4 shows a network using the PMD compensator according to the invention.

The compensation arrangement of the invention may provide PMD and chromatic dispersion compensation at the nodes of a network. As shown in FIG. 4, the network comprises a number of nodes 50. Node 50a is represented simply as a transmitter and node 50c is represented simply as a receiver. Data is transmitted by the network from node 50a to node 50c. The nodes are spaced by amplifiers 52, Node 50b is shown in greater detail, and comprises an optical switching arrangement 54 for routing signals between ports of the arrangement. For simplicity, the components are shown for unidirectional traffic between nodes 50a and 50c, although of course the network will support bidirectional data flow.

Each node has a demultiplexer 56 for dividing incoming WDM data into the individual channels. These channels are subjected to dispersion compensation using the arrangement 58 of the invention. Signals the output ports of the switching arrangement 54 are multiplexed onto the single ouput fiber using multiplexers 60.

The nodes support the adding and dropping of channels, and the source node 50a essentially adds channels whereas the destination node 50c drops those channels, to enable communication between the source and destination. The arrangement 58 may be at the input or output of the switching arrangement 54, and the amplifiers 52 may also be provided with PMD and chromatic dispersion compensation using the arrangement of the invention.

The two compensators in the device of the invention may of course be arranged in either order. Similarly, the chromatic dispersion compensator may be positioned between the polarization controller and the delay element of the PMD controller. Various other modifications will be apparent to those skilled in the art.

We claim:

1. A polarization mode dispersion (PMD) compensation arrangement for receiving an optical input data signal which has been subjected to PMD, the arrangement comprising an adaptive chromatic dispersion compensator and a first-order PMD compensator, wherein the adaptive chromatic dispersion compensator is controlled to provide compensation for both chromatic dispersion and second order PMD, and wherein a feedback loop from the output of the arrangement is used to derive control signals for controlling the adaptive chromatic dispersion compensator and the first-order PMD compensator.

2. An arrangement according to claim 1, wherein the feedback loop provides electrical spectrum analysis of the output.

3. An arrangement according to claim 1, wherein the first-order PMD compensator comprises a polarization controller and a fixed delay element.

4. An arrangement according to claim 1, wherein the adaptive chromatic dispersion compensator comprises first and second chirped Bragg reflection gratings, wherein at least the first grating is coupled with a strain applicator for applying axial strain to the grating for tuning the grating.

5. An arrangement according to claim 4, wherein the two gratings are coupled to a four-port circulator together with the input and output of the compensator.

6. An arrangement according to claim 4, wherein the strain applicator comprises a piezoelectric transducer on which the chirped grating is mounted.

7. An arrangement according to claim 6, wherein the piezoelectric transducer can be tuned so that the grating provides a selected level of dispersion compensation within less than 1 ms.

8. An arrangement according to claim 4, wherein the stain applicator enables dispersion compensation within a range up to 60 ps/nm, and wherein the second grating is also coupled with a strain applicator which enables dispersion compensation within a range greater than 60 ps/nm.

9. A method of providing polarization mode dispersion (PMD) compensation comprising:

using an adaptive chromatic dispersion compensator to compensate for chromatic dispersion and second-order PMD; and using a first-order PMD compensator to compensate for first order PMD, wherein the adaptive chromatic dispersion compensator and the first-order PMD compensator are controlled by a single feedback control loop.

10. A node for an optical communications system, comprising an optical switching arrangement for routing signals through the node, the node further comprising a polarization mode dispersion (PMD) compensation arrangement for receiving an optical input data signal which has been subjected to PMD, the arrangement comprising an adaptive chromatic dispersion compensator and a first-order PMD compensator, wherein the adaptive chromatic dispersion compensator is controlled to provide compensation for both chromatic dispersion and second order PMD, and wherein a feedback loop from the output of the arrangement is used to derived control signals for controlling the adaptive chromatic dispersion compensator and the first-order PMD compensator.

11. An optical communications system comprising a plurality of nodes, each node comprising an optical switching arrangement for routing signals through the node, the node further comprising a polarization mode dispersion (PMD) compensation arrangement for receiving an optical input data signal which has been subjected to PMD, the arrangement comprising an adaptive chromatic dispersion compensator and a first-order PMD compensator, wherein the adaptive chromatic dispersion compensator is controlled to provide compensation for both chromatic dispersion and second order PMD, and wherein a feedback loop from the output of the arrangement is used to derive control signals for controlling the adaptive chromatic dispersion compensator and the first-order PMD compensator.

* * * * *